US005404396A

United States Patent [19]
Brennan

[11] Patent Number: 5,404,396
[45] Date of Patent: Apr. 4, 1995

[54] FEATURE INTERACTION MANAGER

[75] Inventor: Steven Brennan, Plano, Tex.

[73] Assignee: Telefonaktiebolaget LM Ericsson, Stockholm, Sweden

[21] Appl. No.: 113,290

[22] Filed: Aug. 27, 1993

[51] Int. Cl.[6] .......................................... H04M 3/42
[52] U.S. Cl. .................................. 379/201; 379/203; 379/204; 379/157
[58] Field of Search ................... 379/201, 207, 93, 94, 379/112, 113, 122, 144, 67, 211, 157

[56] References Cited

U.S. PATENT DOCUMENTS

| | | | |
|---|---|---|---|
| 4,763,353 | 8/1988 | Canale et al. | 379/157 |
| 4,878,240 | 10/1989 | Lin et al. | 379/67 |
| 4,893,335 | 1/1990 | Fuller et al. | 379/200 |
| 4,905,274 | 2/1990 | Cooper et al. | 379/157 |
| 5,029,196 | 7/1991 | Morganstein | 379/67 |
| 5,036,535 | 7/1991 | Gechter et al. | 379/210 |
| 5,136,690 | 8/1992 | Becker et al. | 379/122 |
| 5,241,588 | 8/1993 | Babson, III et al. | 379/94 |
| 5,337,351 | 8/1994 | Manabe et al. | 379/201 |

OTHER PUBLICATIONS

Michael Cain; "Managing Run-Time Interactions Between Call-Processing Features"; IEEE Communications Magazine, Feb. 1992, pp. 44–50.

Primary Examiner—James L. Dwyer
Assistant Examiner—Scott Wolinsky
Attorney, Agent, or Firm—Johnson & Wortley

[57] ABSTRACT

A feature interaction manager (FIM) is interposed between a telecommunications switching platform within a network and the feature logic providing call features to subscribers using the platform. Control is interposed within the interface between the detection of events within the switching system and the implementation of the telecommunications services by the feature logic in order to manage the interaction of various ones of a plurality of features provided to a subscriber. The system evaluates events within the network in order to isolate each feature from the other features and associates them only through the feature interaction manager.

33 Claims, 10 Drawing Sheets (STATE 1)

(STATE 2)

(STATE 3)

(STATE 4)

(STATE 5)

(STATE 6)

(STATE 7)

(STATE 8)

(STATE 9)

(STATE 10)

(STATE 11)

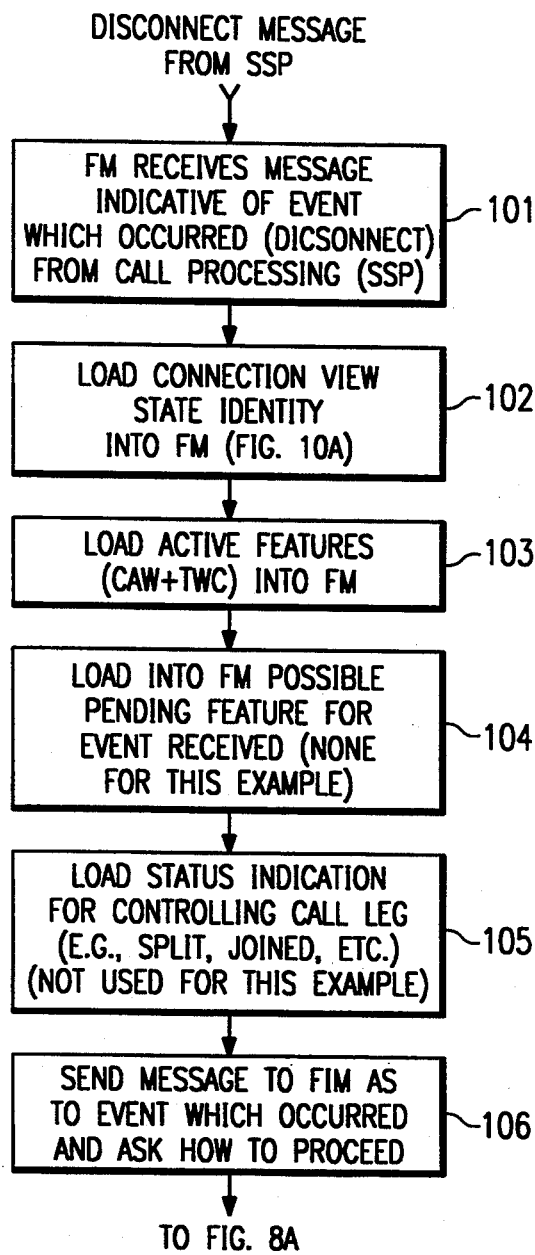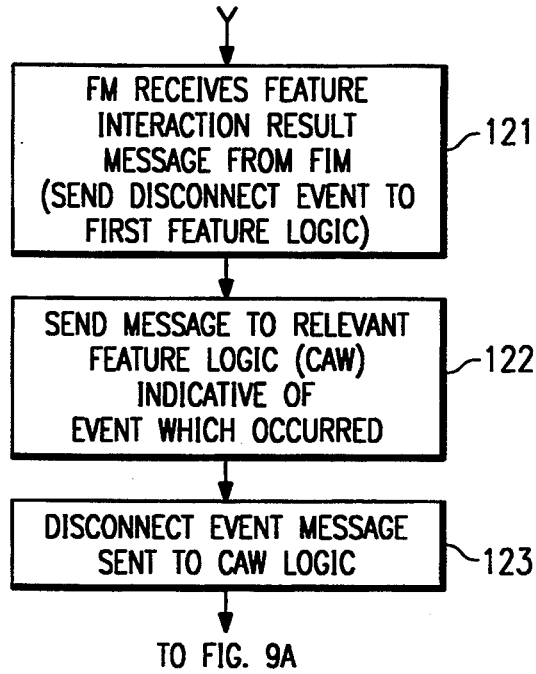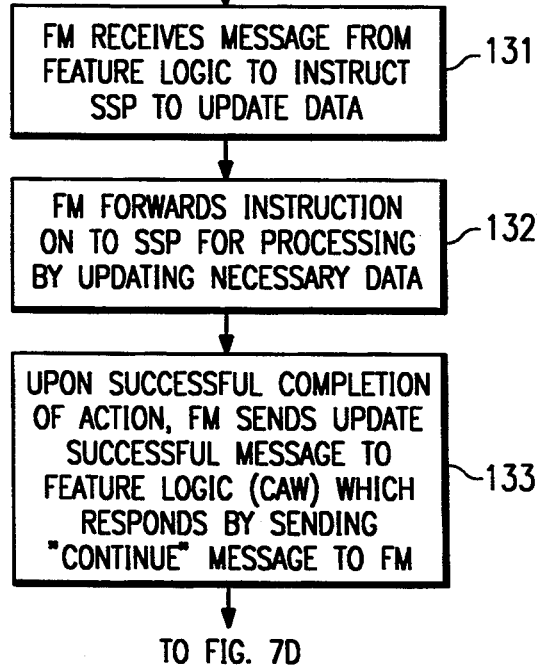

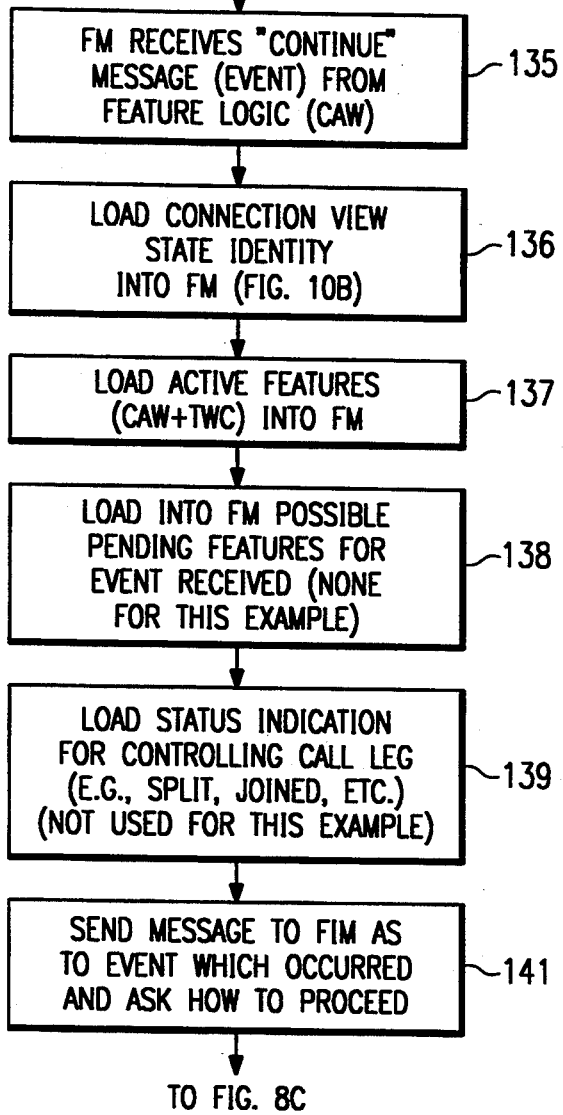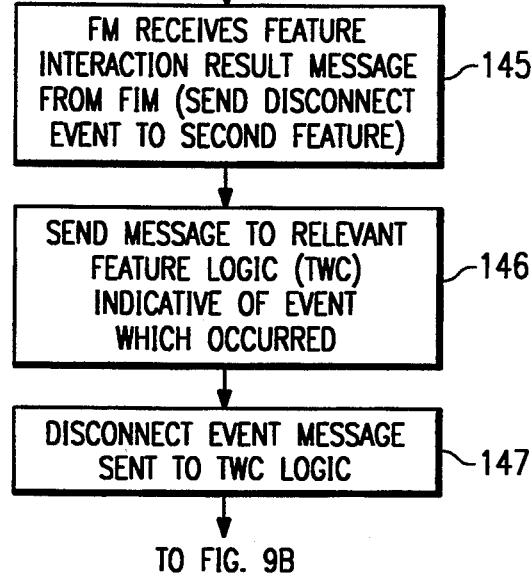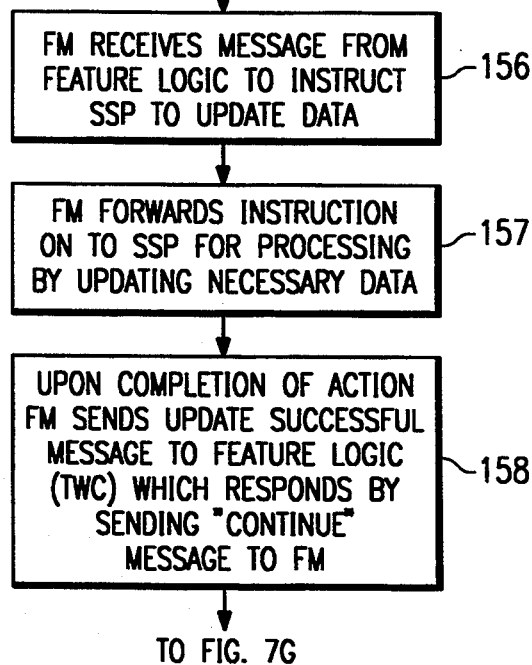

FROM FIG. 7F

TO FIG. 8D

FROM FIG. 8D

NEXT EVENT REQUEST MESSAGE

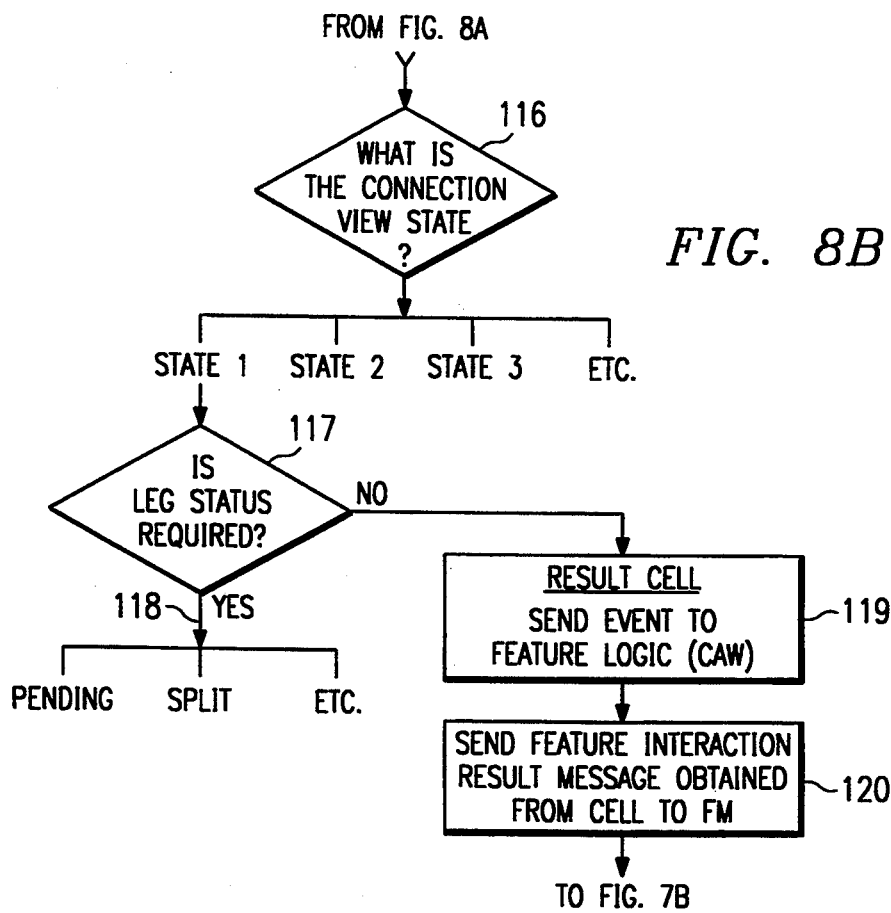
FIG. 8B
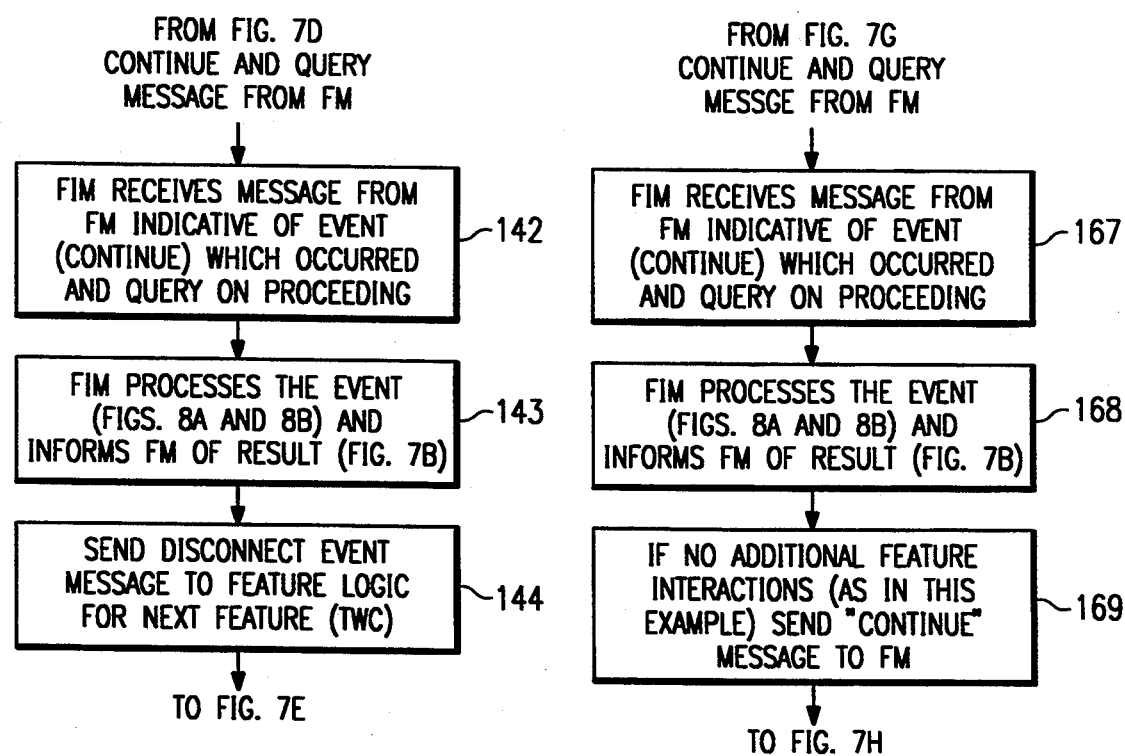
FIG. 8C
FIG. 8D

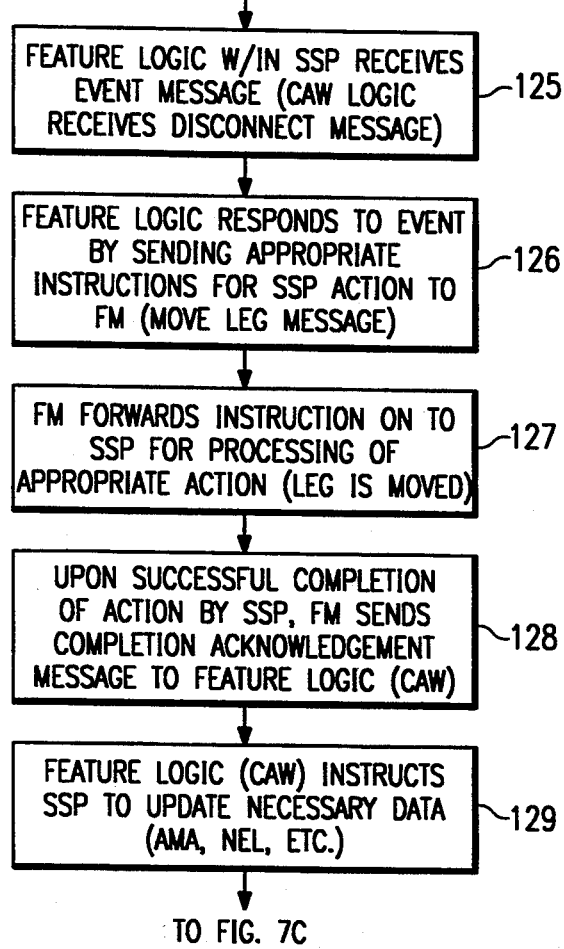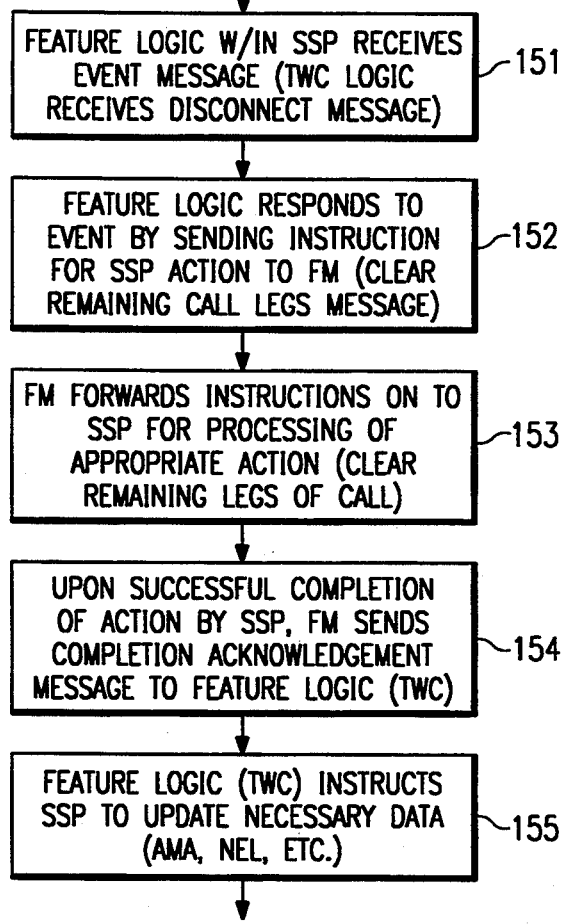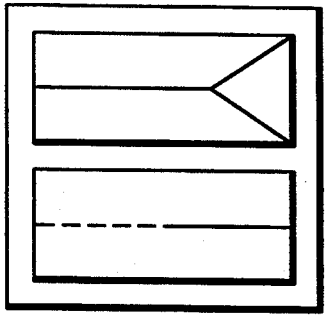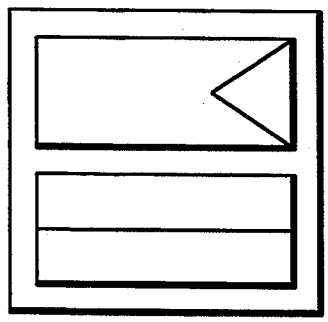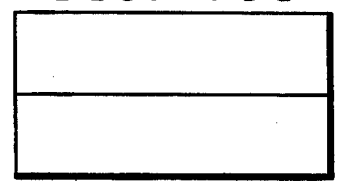

FEATURE INTERACTION MANAGER

BACKGROUND OF THE INVENTION

1. Field of the Invention

The invention relates to the control of call features within a stored program controlled telecommunication switching system and, more particularly, to a system for managing the interaction of a plurality of such features within a network.

2. History of the Related Art

Stored program controlled telecommunication switching systems and networks provide not only conventional two party interconnection services, but many additional calling features as well. In recent years subscribers have demanded, and telecommunications system operators have provided, many new "features" which incorporate functionality beyond conventional two party A to B calls, for example, features such as call waiting, multi-party conference, voice messaging, call forwarding and many others. Features are generally invoked and controlled by means of a controlling subscriber signalling the system with switch hook flashes, or the dialing of certain digits, each referred to as an "event". However, there are a limited number of events which can be caused by a subscriber and a large number of potential features which can be invoked and/or controlled by the same events.

As the number of available features offered within a telecommunication switching network increases, the possible interaction between the features becomes highly significant and a source of both potential confusion to the subscriber as well as faults within the network. For this reason, feature managers are provided within the switching system which manage the functionality of each feature in such a way that the different aspects of the functionality is coordinated. A feature manager monitors each event which occurs and directs that event to the feature logic of the software block implementing a feature which requires that event for invocation and/or control. However, when more than one feature requires the same event, the situation becomes more complex and requires that access to certain features be suspended and/or prioritized when other features are in use by a subscriber. Thus, marketing and administration of a large array of features to subscribers requires the provision of a "feature interaction listing" indicating the particular feature priorities and prohibitions which are applicable within the system depending upon which particular features are either currently in use or currently being invoked by a subscriber. This is not a good solution in that a subscriber who has paid for a particular feature within his subscription, should not be inhibited from using that feature simply because he is currently using a related feature with which there is an event conflict or because the software is unable to implement both features at the same time.

Moreover, as telecommunication solutions become increasingly network oriented, there is a great need for the provision of a feature interaction manager to monitor the occurrence of events within both the switch and network and coordinate the activities of the various feature managers to ensure that the correct features receive the event in the correct order so that implementation of the features does not disrupt the behavior of the switch or network in an adverse way. The system of the present invention provides such a feature interaction manager.

SUMMARY OF THE INVENTION

In one aspect, the present invention includes the interposition of control of the interface between the detection of events within a switching system and the implementation of telecommunications services by feature logic in order to manage the interaction of various ones of a plurality of features to be provided by the system. The system evaluates events in order to control the rendering of telecommunication services by feature logic. The present system enables the isolation of each feature from the other features and associates them only through the feature interaction manager of the present invention.

In another aspect, the invention includes controlling the interaction of features within a telecommunication switching network which includes a service switching platform having call completion logic and software logic blocks for the implementation of particular call features. The switching platform also includes feature managers for providing control signals from the network to the logic blocks for invoking and implementing a feature in response to subscriber produced events within the network. A feature interaction manager is connected to each feature manager for controlling the interface of information flowing from the events occurring within the service switching platform to the feature manager to enable the smooth interaction of a plurality of features invoked by a single subscriber during a call within the service switching platform. In addition, information associated with each subscriber which can invoke the features, and indicative of parameters related to the invocation and use of the features by the subscriber, is stored within a data base to which the feature interaction manager has access.

In a further aspect, the invention relates to a telecommunications network serving a plurality of subscribers having a service switching platform including logic for the completion of calls between said subscribers. Software blocks provide feature logic for the implementation of a plurality of call features in response to network events produced by actions taken by the subscribers. A feature manager is associated with each of the call features for receiving signals from the network indicative of events produced by actions by the subscribers and for providing control signals to the call feature logic. A data base stores information related to each subscriber within the network having the capability of invoking and controlling the call features. A feature interaction manager is connected between the feature manager and the data base for receiving signals from the feature manager indicative of events received by the manager and including means responsive to the received events and the information stored within the data base related to the subscriber which caused the events. The feature interaction manager instructs the feature manager on what signals to send to said feature logic in order to interactively implement the features invoked by the events produced by the actions of the subscriber.

BRIEF DESCRIPTION OF THE DRAWINGS

For a more complete understanding of the present invention and for further objects and advantages thereof, reference may now be had to the following description taken in conjunction with the accompanying drawings, in which:

FIGS. 7A-7H are flow charts illustrating processes performed in the feature manager in accordance with the present invention;

FIGS. 8A-8D are flow charts illustrating processes performed in the feature interaction manager in accordance with the present invention;

FIGS. 9A and 9B are flow charts illustrating processes performed in the feature logic in accordance with the present invention; and FIGS. 10A-10C are diagrams illustrating connection view states illustrating the example of feature interaction shown in FIGS. 7A-7H, 8A-8D and 9A-9B.

DETAILED DESCRIPTION

Figure 1:
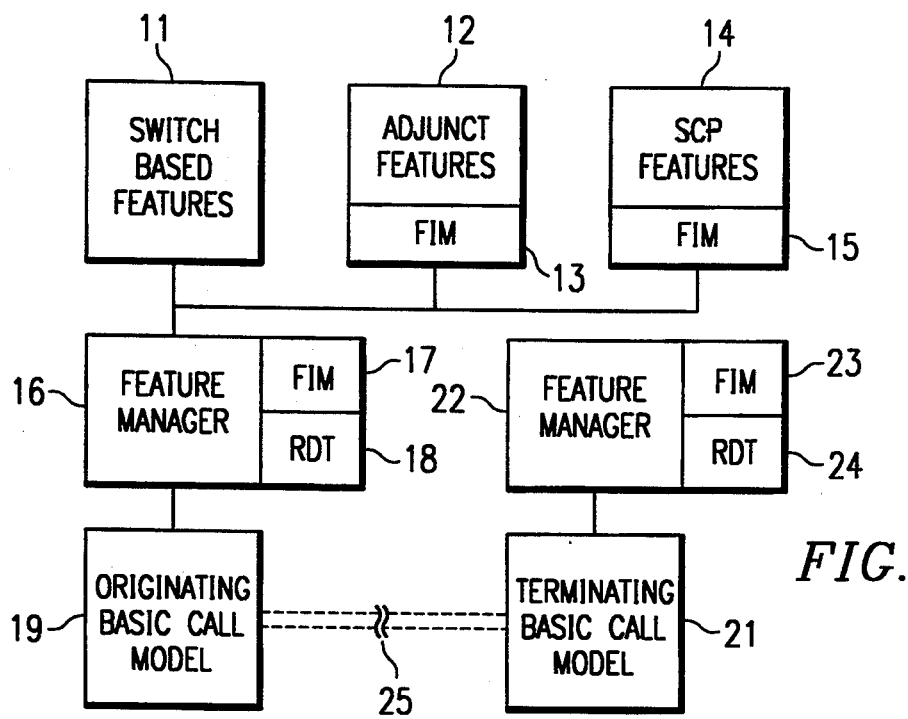
FIG. 1 is a block diagram of an adjunct/SCP network structure incorporating the feature interaction manager of the present invention.

In general, control of feature interactions in accordance with the principles of the present invention requires the specification of an algorithm to handle the use of multiple features within the same call. Such an algorithm must be generic enough to handle all possible combinations of feature usage in the same call. Interactions are handled based upon the call image; the features which subscribers have activated or have access to; the current call event being processed; a list of features that may be invoked in response to the event being processed; a list of features currently being used; a list of call events the active features subscribe to; and, a list of call events that invoke new features.

Certain basic concepts are employed in the implementation of feature interaction management in accordance with the present invention. These concepts include an active feature list (AFL) containing all of the features active on a particular call, as well as a connection view (CV) which comprises a conceptual image of a call containing both network and controlling legs. Each connection view is defined and identifiable as a standard call configuration as will be further explained below. A feature inhibit list (FIL) comprises those features that are to be inhibited on a particular call and the list is sent over the network and remains in effect for the duration of a call. A feature interaction manager (FIM) response is an event or action that the feature manager (FM) must act upon. The response may be a seizure request, an event, a request for a feature termination, or an order for continuation of the call process. A feature list (FL) comprises those features which are available on the network, each of which features is identified by a unique global designation.

A feature order is employed to manipulate the connection view sent by the feature logic to the feature manager, but not to the feature interaction manager. A continue response or equivalent feature response are notices from a feature logic to the feature manager that the feature has completed its processing, is in a stable condition and is handing control back to the service switching platform. Each continue or equivalent response is sent from the feature manager to the feature interaction manager. A next event list (NEL) comprises all of the events that active features and FIM's subscribe to, while a pending feature list (PFL) comprises all the features that may be invoked classified by their seizure point, i.e., the point in the call process at which features may be invoked. Each feature has a specific seizure point.

Interactions specified in accordance with the present invention are based upon the half call model in which subscribers appear to be in different end offices so a subscriber on either hard hold or soft hold from a subscriber in another end-office may flash and use features. In this system, the feature interaction manager (FIM) controls runtime feature interactions based upon a set of data. The subscriber data set is defined as the next event list (NEL), the connection view (CV), the active features list (AFL), the pending features list (PFL), and the current event being processed. Optionally, the network may add to the data a feature inhibit list (FIL) as part of the data set to be used by the FIM. The FIM only interfaces with the feature manager (FM) and its database to resolve interactions and has the capability of receiving network events and feature responses from the FM. The FIM further provides a response to the FM for each event and for each feature response and has the capability of both reading and writing information from and into the subscriber data set within the database. The FIM uses a set of system principles to control runtime feature interaction which incorporate control mechanisms for interaction resolution under normal conditions as well as under default conditions. Interactions are controlled based upon different levels of interaction specification including subscriber bases, business group bases, and exchange bases. Each FIM is able to terminate a feature at any time and to inhibit seizure of a feature based upon the inhibit list that is received from the network and stored in the database.

The FIM's interface with the feature manager is such that the next event list (NEL) is constructed initially of all feature seizure points. When a seizure point is encountered, the FM sends a message containing the event to the FIM in order to determine the next course of action. The FIM then returns a response to the FM which may include an order to seize a feature or continue normal call processing based upon the subscriber data set read by the FIM. If the order is to seize a feature, the FM sends a seizure request to the feature logic. When the feature logic sends a continue response to the FM, the response is then sent on to the FIM. The FIM may send another request to the FM or just a continue message and, at this point, the FM adds the feature to the active features list (AFL). At each feature response, the next event list (NEL) is updated with the feature supplied NEL. When a feature already exists in a call and a network event is received that is in the NEL, the FM sends the event to the FIM. The FIM then determines the action required from the subscriber data set and sends it to the FM. When a network event is received that is not subscribed to, the FM simply "swallows" or ignores the event.

All continue type feature responses are sent from the FM to the FIM. If network events are received while the FIM is processing another event or feature response, the FM buffers the network events within a data buffer. Only one network event may be processed at a time for a particular call instance in order to insure that the process remains synchronous.

The system of the present invention proposes a solution to the problems of feature interaction which can be implemented on a network level. Such networks will likely be based upon the standards set forth in "Advanced Intelligent Network (AIN), Release 1, Switching Systems Generic Requirements, TA-NWT-001123, issued May 1991, by Bellcore", hereby incorporated by reference herein.

The network feature interaction manager (FIM) of the present invention is divided into three main feature platform areas which include: (1) switch based feature interactions; (2) switch/adjunct feature interactions; and (3) originating/terminating half call interactions.

Switch Based Feature Interaction

The switch based feature interaction manager includes a central processor software unit which is an integral part of the feature manager in the sense that it is part of the feature manager functionality though not part of that software unit. The feature interaction manager is strategically placed within the network to control events that are generated by the network and then distribute those events to the interested feature platforms. When the feature interaction manager (FIM) receives a response type continue message from the feature platforms in order to achieve a desired result during a feature interaction conflict, the response message may also require that the FIM order an event to be generated toward a secondary feature before the call process can continue.

The FIM itself consists of data files, also referred to as cells, which store the results of feature interactions. The files are dynamically referenced during runtime by the event or continue type feature response and by the features that are involved in the call at that particular time. The results of the feature interactions are defined by commands, also referred to as administrative action, which provide total flexibility when defining a desired result to solve a particular feature interaction.

Referring to FIG. 1, there is shown a block diagram of a conceptional network FIM structure which indicates, at a high level, that features are supported on different platforms throughout the network. The structure includes switch based features 11, adjunct features 12, which are managed by feature interaction manager 13, and subscriber control point (SCP) features 14, which are managed by a separate feature interaction manager 15. The switch based features are managed by a feature manager block 16 which functionally includes a feature interaction manager module 17 and a recall dial tone (RDT) module 18. Each of the feature managers are associated with an originating basic call model (OBCM) 19. A terminating basic call model (TBCM) 21 has associated with it a feature manager 22 with which is functionally associated a feature interaction manager 23 and a recall dial tone (RDT) module 24. The originating basic call model 19 and the terminating basic call model 21 are associated through the switch 25.

The recall dial tone (RDT) function, also known as soft hold, is considered an integral part of the feature manager. This is because the analysis of the dialed user information can directly or indirectly invoke a feature and the results of analysis should therefore be readily available to the feature interaction manager for possible feature seizure.

The responsibilities of the feature interaction manager with respect to switch based feature interactions within a switch based environment can be divided into several functional components as follows:

(a) The FIM provides a feature takeover point (TOP) and a precedence list on a per subscriber, per business group or per office basis. The order of precedence is given by administration action performed by the operator of the switch.

(b) The FIM provides a mechanism for the inhibiting of pending features. Such inhibition of pending features can be determined dynamically on a per call basis (e.g., such may be ordered from an adjunct, or by administration action to be taken by the operator of the system).

(c) The FIM provides a mechanism for allowing one or more pending features to be seized when subscribing to the same event. Such features are selectively set up by administrative action by the operator.

(d) The FIM provides a mechanism for allowing both a pending feature and an active feature to receive a subscribed event, which is also set up by administrative action by the operator.

(e) The FIM provides a mechanism for allowing one or more active features to receive a subscribed event, as selected by administrative action by the operator.

(f) The FIM also provides a mechanism for disconnection of a specific feature, as selected by administration action by the operator.

(g) The FIM supports system default principles when selected FIM data is not specified.

To enable the FIM to perform its responsibilities, it must have a number of parameters specified to it. These requirements are satisfied by inputs to the FIM effected either by command by the operator or dynamically on a per call basis to control the interaction of the features controlled by the feature managers associated with the FIM. These requirements or inputs include:

(a) the current connection view state;
(b) the currently active features;
(c) events generated by the network;
(d) responses from the feature platforms; and
(e) possible feature inhibit information.

The FIM requires that each of the features to be controlled have a global identification number to enable communication about them within the network. Each of the above FIM requirements are defined as FIM branching parameters. It should be noted that other parameters such as controlling and passive leg states may also be introduced as needed.

Figure 2A:
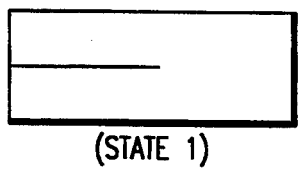
FIGS. 2A-2K are diagrams illustrating a plurality of different possible connection view states which may occur within the switching system.
Figure 2B:
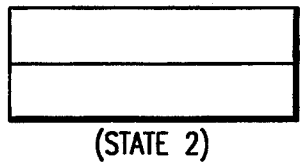
Figure 2C:
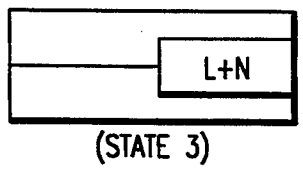
Figure 2D:
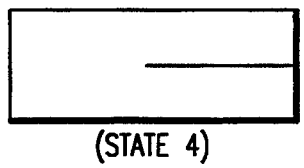
Figure 2E:
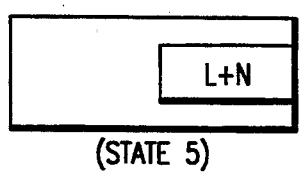

The first parameter, the connection view state, is a reflection of the call image between the controlling user and the network itself. The diagrams shown in FIGS. 2A–2K illustrate a number of possible connection views that might be of interest to the FIM. While more possible states have been identified, the 11 states shown in FIGS. 2A-2K are merely illustrative of the principle of state characterization. Each connection view shown consists of one or two connection segments and a number of legs. To pass the details of all of this information to the FIM would be a highly expensive data interchange transaction and is avoided in the present system by assigning to each of the possible connection views a connection view state identity. This connection view state identity is used by the FIM as a branching parameter. FIGS. 2A-2K comprise a plurality of call configuration diagrams illustrating various possible connection view states, each of which have been assigned a state identity in accordance with the present invention. In these call configuration diagrams the controlling leg is always on the left side of the connection point and the passive leg is always on the right. The leg status for each call is not shown explicitly and may be pending, split, joined, shared, surrogate or interacting. The notation "L+N" refers to the presence of two or more passive legs, i.e., a multi-party call with at least two passive legs. The diagram in FIG. 2A (state 1) illustrates an off-hook condition by the originating or A party. FIG. 2B (state 2) illustrates a call completion from an originating or controlling A party to a terminating or passive B party. FIG. 2C (state 3) illustrates a completed call from a controlling A party to a plurality of passive B parties, i.e., a three way call completion. FIG. 2D (state 4) illustrates a call completed from a controlling A party to a passive B party in which the A party has put the B party on hold. FIG. 2E (state 5) illustrates a three way call from a controlling A party to a plurality of B parties in which the A party has put all of the B parties on hold.

Figure 2F:
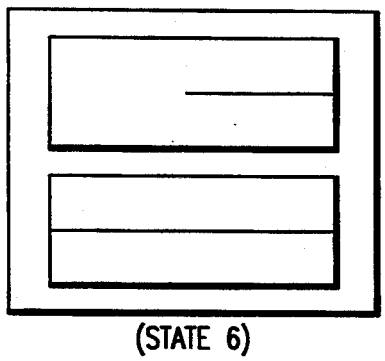
Figure 2G:
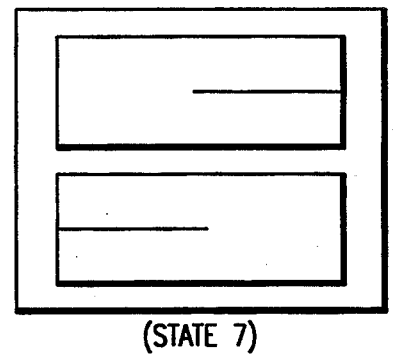
Figure 2H:
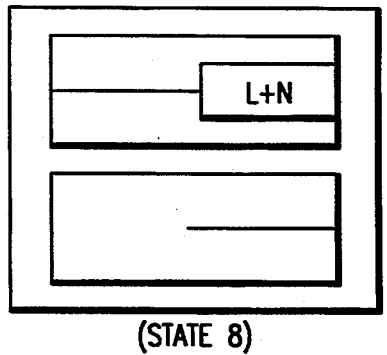
Figure 2I:
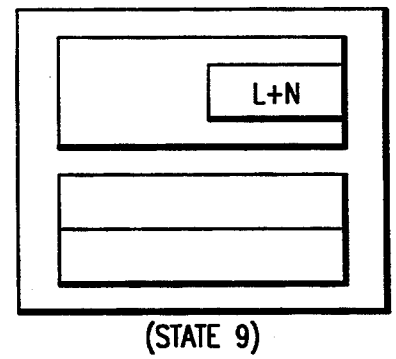
Figure 2J:
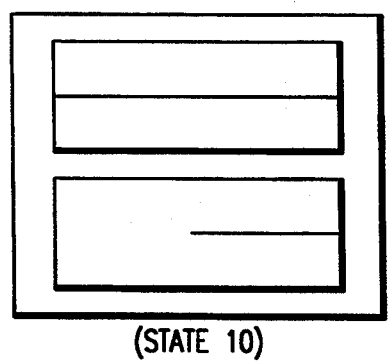
Figure 2K:
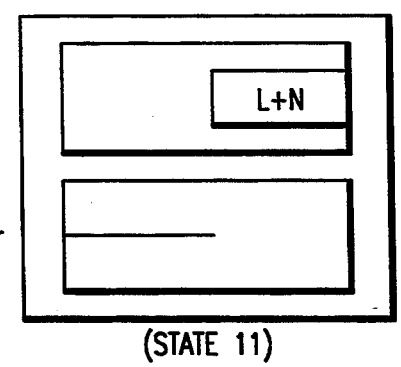

FIG. 2F (state 6) illustrates a call configuration in which a first call by a controlling A party has been completed to a passive B party and then placed on hold followed by a second call by the controlling A party to a passive C party in which the connection is in progress. FIG. 2G (state 7) similarly illustrates a first call by a controlling A party to a passive B party which has been placed on hold followed by an off-hook condition by the controlling A party. FIG. 2H (state 8) illustrates a first call by a controlling A party which was completed to a pair of B parties (L+N) followed by a second call by the controlling A party to a C party which has been placed on hold, after which, the A party returns to the three way call with the pair of B parties. FIG. 2I (state 9) illustrates a first call by a controlling A party to a pair of B parties which has been placed on hold followed by a second call by the controlling A party to a passive C party which is completed and in progress. FIG. 2J (state 10) illustrates a call sequence in which a first call by a controlling A party was completed to a passive C party which has been placed on hold with the A party returning to the first call with the B party. Finally, FIG. 2K (state 11) illustrates a first call by the controlling A party to a pair of B parties which has been placed on hold followed by an off-hook condition by the controlling A party.

The switch based feature interaction manager uses the active features on a controlling leg when necessary as a branching parameter. In certain situations, active feature information may be received from an adjunct or the originating/terminating side of the half call during call setup. One example of this might include the circumstances when call waiting originating (CWO) is activated toward the terminating side of the call. Network events are points in the call setup which are inclusive of subscriber actions, such as switch hook flash, which can be subscribed to by an adjunct/SCP or switch based features. It is also a requirement that the FIM can subscribe to these events and the criteria for such subscription includes:

(a) a specific event can invoke a provisioned feature, e.g., call waiting (CAW), on the busy event;
(b) a specific event can invoke a communication between an adjunct/SCP; and
(c) a specific event is part of the next event list which is of interest to an active feature or adjunct/SCP. One example of this is call waiting (CAW) when an active call subscribes to the flash event in its next event list.

Upon receipt of any of these events, the FIM is in a position to distribute the event according to the call-/feature scenario at that point in the call processing procedure. The FIM will also have the capacity to order the feature manager to queue network events until features and the connection view are in a stabilized condition.

Response type messages from service logic may result in the following:

(a) the FIM may want to generate an event to either seize or stabilize a particular feature after the previous feature has performed a specific action; and
(b) due to the actions performed by a previous feature, a seized feature may now be redundant, therefore, the FIM has the opportunity to terminate that feature.

While service logic has control of the call process, any events that are generated by the network are queued until the FIM has completed these tasks. In certain conditions it may also be a requirement for the FIM to know if one or more passive network legs are in a held condition. This information may be received from the originating/terminating side of the half call model during any point of the call.

With respect to switch based system defaults, if there are no active features in the call, the seizure point or takeover point (TOP), at the subscriber level is checked first. If no TOP is defined, the TOP on the business group level is checked, then the TOP on the office level is checked. If there are no features defined on the office level, the system default is to continue normal call processing. If there are active features in the call subscribing to the same event and no runtime results are defined for that interaction, then the system default is invoked. That is, the last feature to monitor for that event will receive notification of the event. In these situations, the system default prevents seizure of a feature if the takeover point i s the same event.

Switvh/Adjunct Feature Interaction

Figure 3:
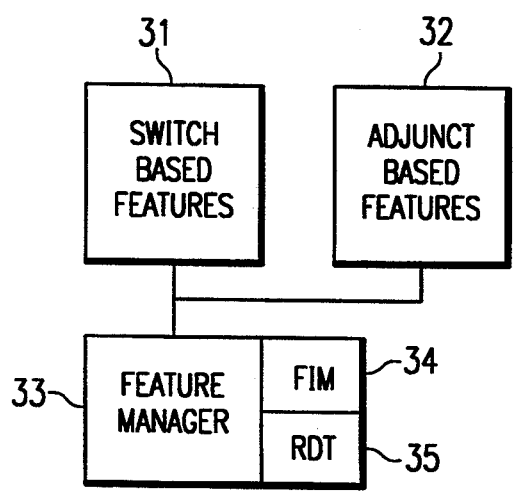
FIG. 3 is a block diagram illustrating a feature interaction manager constructed in accordance with the teachings of the present invention supporting features both in a switch and in an adjunct.

The present system includes two solutions to switch/adjunct feature interaction, each being dependent upon administrative configuration. First, in FIG. 3, there is shown a block diagram of a feature interaction module supporting features both in the switch and in the adjunct. Switch based features 31 and adjunct bas ed features 32 are both associated with a feature manager 33 which functionally includes a feature interaction manager 34 and a recall dial tone module 35. In this configuration the switch based feature interaction module controls feature interactions for features which are both switch based and adjunct based. One requirement for the FIM is that all features residing in the adjunct are known to the FIM by a global feature identification number. The administration can then control all interactions the same as if all the features were residing in the switch itself. An exemplary description of this solution is given below in connection with FIM data base population of Case 1, beginning on page 22.

Figure 4:
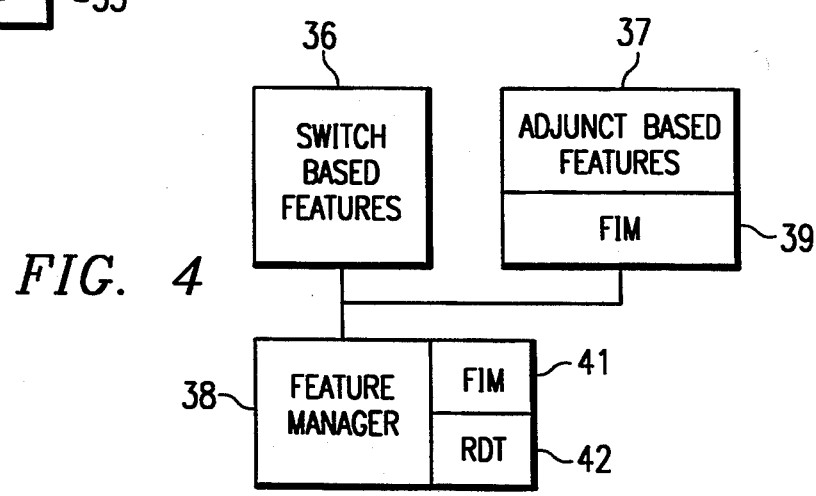
FIG. 4 is a block diagram illustrating a feature interaction manager constructed in accordance with the teachings of the present invention residing in both a telecommunication switch and an adjunct.

Referring next to FIG. 4, there is shown a block diagram of the configuration in which a feature interaction manager resides both in the switch and in the adjunct. There, switch based features 36 and adjunct based features 37 are associated with a single feature manager 38. A first feature interaction manager 39 resides in the adjunct 37 while a second feature interaction manager 41 and a recall dial tone module 42 are both associated with the feature manager 38. Interaction between switch based features are controlled by the switch based FIM 41, while interactions between the adjunct based features are controlled by the adjunct based FIM 39. When interactions occur between the switch and adjunct based features, the resolution of feature interactions is distributed between both FIMs as illustrated below in connection with the FIM data base population of Cases 2 and 3, beginning on page 25.

To implement this configuration, a requirement is placed on the switch such that when communication is established with an adjunct, the switch sends the following information:

(a) all switch based features, if any, that are currently active for the controlling subscriber;

(b) all pending switch based features which can be invoked on a current switch event; and (c) all pending switch based features which can be invoked at any time during the call process.

Upon receipt of this information, the FIM in the adjunct is in a position to control feature interactions by means of the following actions:

(a) it can inhibit certain switch based features from being invoked, both in the current event and features which can be invoked later in the call process; and (b) by expanding available adjunct/switch messages or introducing dedicated adjunct/switch messages, the adjunct based FIM can order the FIM in the switch to invoke any of the mechanisms set forth above with respect to the responsibilities of a FIM in a switch based environment.

As an addition, in order for the FIM in the adjunct to fully control feature interactions between the switch and adjunct based features, it may be necessary for the adjunct based FIM to subscribe to continue response messages generated from the switch based features.

As an alternative to the multi-FIM solution of providing a FIM both in the switch and in the adjunct as described above, the communication between the FIM in the switch and the adjunct can be minimized by having no feature information exchange between the switch/adjunct and instead rely on the following procedures:

(a) the switch based FIM makes all the decisions to allow setup of the communication dialog with an adjunct depending upon the connection view and the active/pending based switch features;

(b) the adjunct based FIM is inhibited from invoking adjunct based features depending upon the received connection view;

(c) the switch based FIM allows certain requests from the adjunct depending upon the connection view and the active switch based features. This allows the switch based FIM to reject adjunct requests; and (d) the switch based FIM controls event distribution between switch based features and the adjunct as previously set forth in the responsibilities of the FIM indicated above.

Originating/Terminating Call Half Interactions

Figure 5:
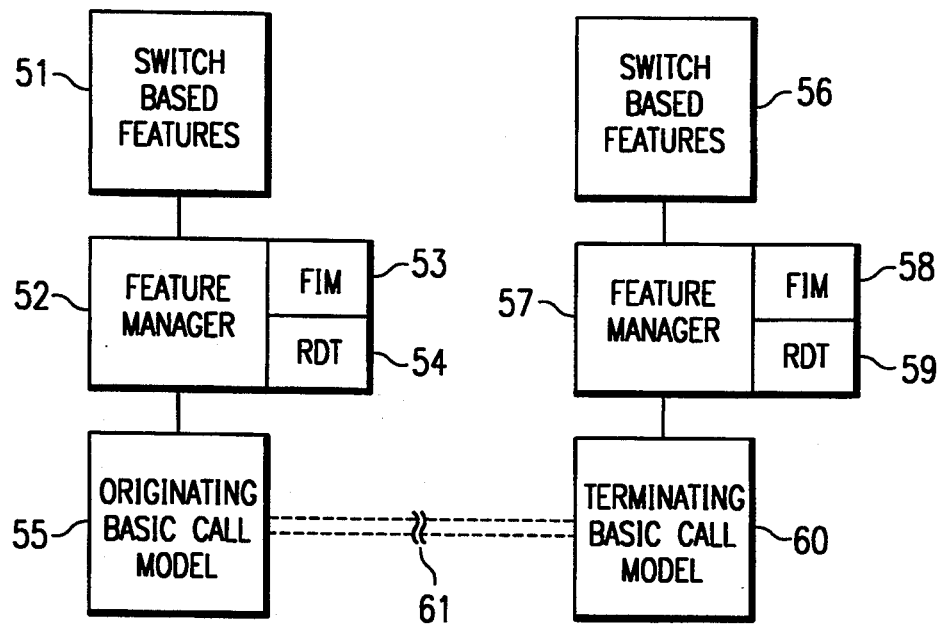
FIG. 5 is a block diagram illustrating the interaction of originating/terminating call halves within a telecommunication switch having a feature interaction manager constructed in accordance with the teachings of the present invention.

Referring now to FIG. 5, there is shown a block diagram illustrating an open communication between originating and terminating call models within a telecommunication switching system. As shown, switch based features 51 are associated with a feature manager 52 having a feature interaction manager 53 and a recall dial tone module 54 associated with the originating basic call model 55. Similarly, switch based features 56 are associated with a feature manager 57 having a feature interaction manager 58 and a recall dial tone module 59 associated with a terminating basic call model 60. The originating and terminating call models, respectively 55 and 60, are associated through the switch 61. The behavior of either call model should be consistent irrespective of their location within the same exchange or not. This should also apply to the feature interaction managers. Networking features require that the communication link 61 between the two call models is expanded to carry active feature information. In the case of originating call waiting (OCW), during call setup to the terminating side, it is necessary for the communication link to include information to the effect that this call is attempting to invoke call waiting on the terminating side. The terminating side uses this information to set the activation bit for call waiting to activate for this call setup attempt. When a busy event is generated and passed to a feature interaction manager for processing, it may invoke call waiting or not depending upon what other pending or active features are involved in the call at that time. The flash event is networked to cause intrusion type features to be invoked on the terminating side. The feature interaction manager decides how this flash event should be processed according to pre-established operator command supplied data.

Figure 6A:
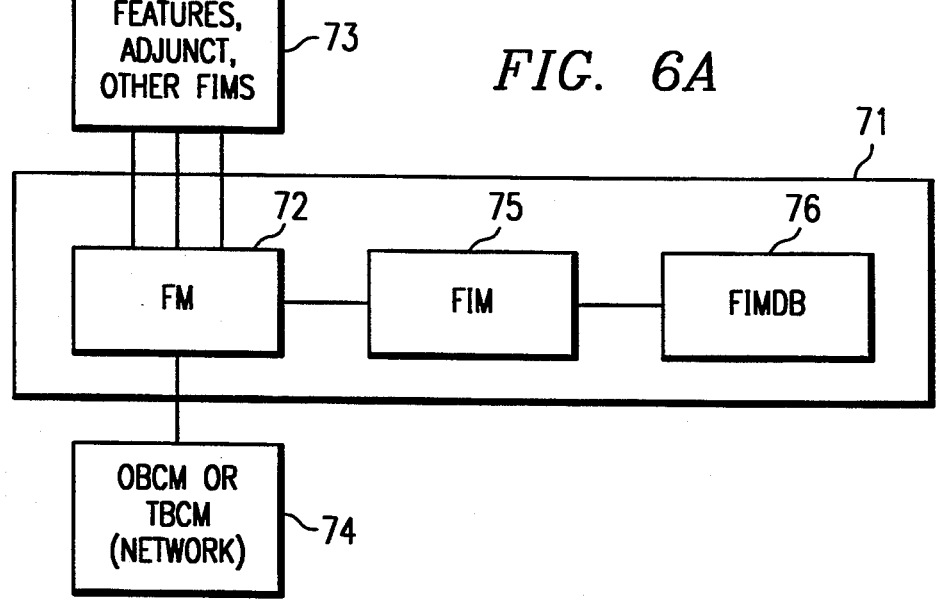
FIG. 6A is a block diagram illustrating the software system architecture of a feature implementation system incorporating the feature interaction manager constructed in accordance with the teachings of the present invention.

Referring next to FIG. 6A, there is shown a block diagram of the overall software system architecture incorporated in the system of the present invention. In FIG. 6A it can be seen that within the software modules of the switch 71, a feature manager 72 is coupled externally to the software module providing other features, adjuncts, or other feature interaction managers represented by block 73. Similarly, the feature manager 72 is also coupled to the originating basic call model or terminating basic call model to obtain state information as represented by the block 74. A feature interaction manager 75 is positioned between the feature manager 72 and the feature interaction manager database 76 to control the interface between the feature manager and other components of the system. The feature manager 72 intercepts signals indicative of all events from the network and routes them to the feature interaction manager 75 based upon a feature interaction manager next event list (NEL). If the FIM is not subscribing to a particular event, i.e., the event is not contained within the FIM's NEL, the FIM ignores or "swallows" the network event and waits for the next event to be indicated by the network.

Set forth below are several examples of situations in which FIM databases are populated with information in order to create logic trees in accordance with the teachings of the present invention. These examples include several different scenarios in which one or more FIMs may reside in one or more network elements.

CASE 1

In the first case, the FIM is assumed to reside in the service switching platform (SSP) controlling all feature interactions. This architecture is similar to that shown and discussed above in connection with FIG. 3. Several illustrative branching parameters will be assumed consistent with the particular exemplary features whose interaction is discussed in connection with the flow charts of FIGS. 7A–7H, 8A–8D, 9A and 9B, and 10A–10C set forth below. First, a global identification value is assigned to each feature, e.g.: three-way calling (TWC)=15; and call waiting (CAW)=18. Next, the available branching parameters are selected to include the following:

(a) an event;
(b) connection view state (STATE);
(c) active features list (AFL);
(d) pending features list (PFL); and
(e) controlling leg state (CLSTATE).

In addition, inhibit feature information may be received from the service logic; however, such information is controlled by the feature manager (FM). If inhibit feature information is received, the FM thereafter masks the pending feature list with the inhibit feature information before communication of that information to the FIM.

The operator of the switching system makes certain basic decisions concerning how the various features should interact with one another upon the occurrence of given conditions. Thereafter, the operator creates a population of data within the FIM database based upon specific branching parameters to be used to reach certain interaction result cells depending upon the particular conditions which exist. The present illustration compliments the example described in connection with the flow charts of FIGS. 7A–7H, 8A–8D, 9A and 9B, and 10A–10C which resolve interaction conflicts between a three-way calling feature and a call waiting feature.

Event 1

Figure 6B:
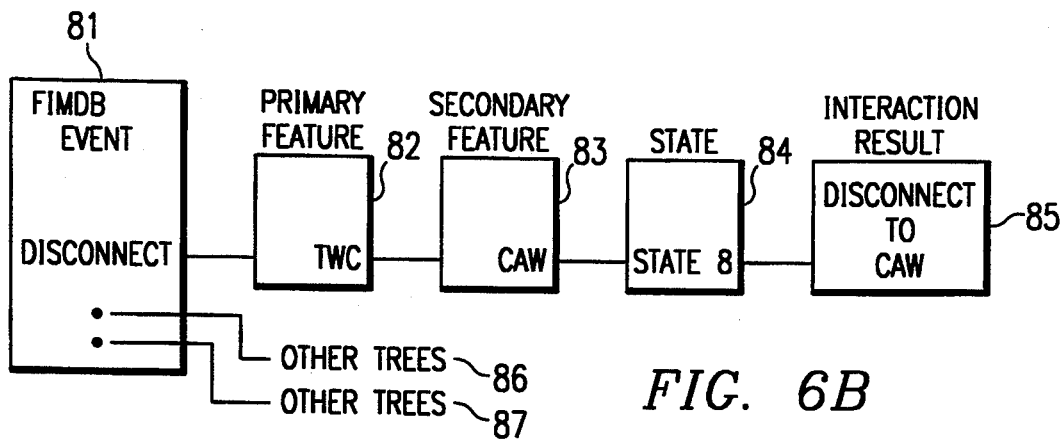
FIGS. 6B-6E are block diagrams illustrating the population of the data bases of feature interaction managers provided in accordance with the system of the present invention.

With respect to a DISCONNECT EVENT, the FIM database may be populated by the system administration to provide the desired result of feature interactions between the three-way calling and call waiting features as set forth below:

COMMAND: SNB=snb, AFL=TWC & CAW; EVENT=DISCONNECT; STATE=STATE8; RESULT=DISCONNECT-CAW;

The FIM database 81, as illustrated in FIG. 6B, is populated to provide a logic tree in which the primary feature 82 is indicated to be three-way calling, the secondary feature 83 is indicated to be call waiting. Additionally, the STATE parameter 84 is indicated to be STATE8 and the interaction result cell 85 is defined to be the sending of a DISCONNECT message to the call waiting feature logic. Other trees, 86 and 87, would be similarly connected to branch in response to other events (other than the DISCONNECT event) defined in the FIM database.

Event 2

Figure 6C:
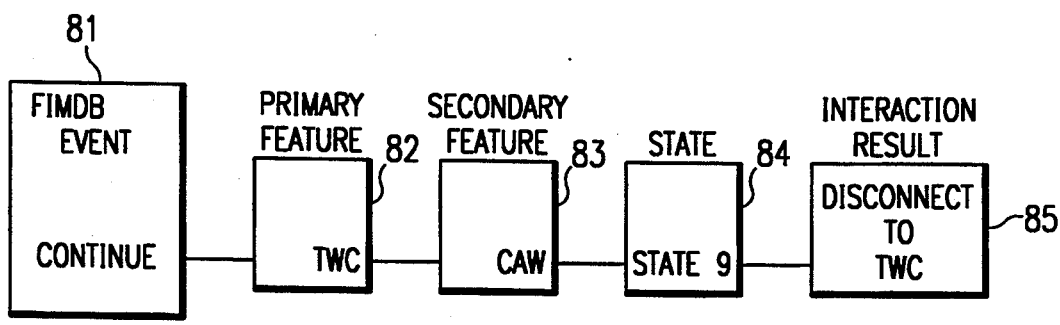

By way of further example, a second event CONTINUE may be defined by the administration within the FIM database as follows:

COMMAND: SNB=snb, AFL=TWC & CAW; EVENT=CONTINUE; STATE=STATE9; RESULT=DISCONNECT-TWC;

As indicated in FIG. 6C, the FIM database 81 is populated to indicate in response to the CONTINUE event that the primary feature 82 is shown to be three-way calling and the secondary feature 83 is indicated to be call waiting. Additionally, the STATE 84 is indicated to be STATE9 while the interaction result cell 85 is populated to indicate the sending of a DISCONNECT message to the three-way calling logic.

Event 3

Figure 6D:
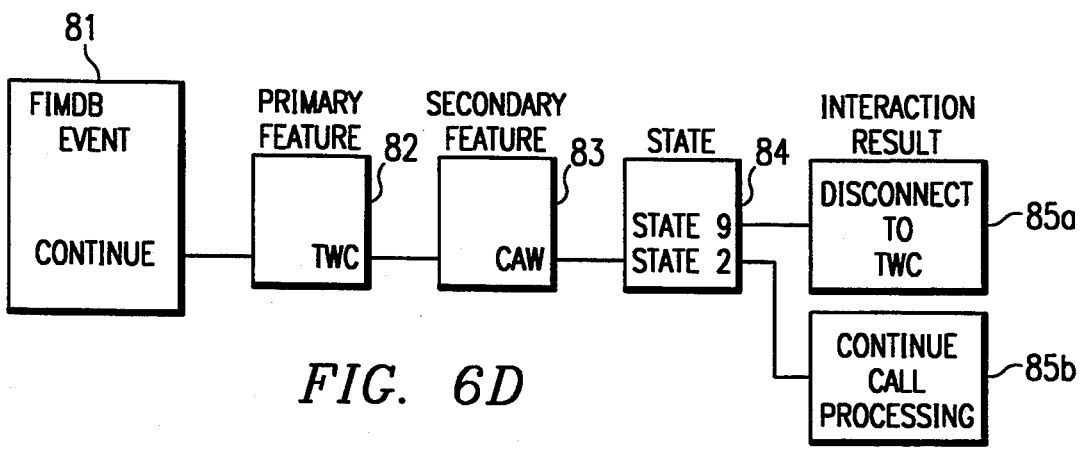

By way of still further example, a third event of CONTINUE may also be populated with respect to other parameters as set forth below:

COMMAND: SNB=snb; AFL=TWC & CAW; EVENT=CONTINUE; STATE=STATE2; RESULT=CONTINUE;

As indicated in FIG. 6D, this continue event is populated within the event database 81 to indicate that the primary feature 83 is three-way calling and the secondary feature 82 is call waiting. Additionally, in the STATE category 84, STATE9 is shown to lead to a result cell 85a indicating the transmittal of a disconnect message to three-way calling while STATE2 in the STATE portion 84 is shown to lead to a result cell 85b of sending a CONTINUE CALL PROCESSING message to the feature logic. It should be noted that the above tree in connection with STATE9, as indicated in FIG. 6C, already existed, so only the appropriate cell need be updated in connection with STATE2 variation in that database population.

CASE 2

Figure 6E:
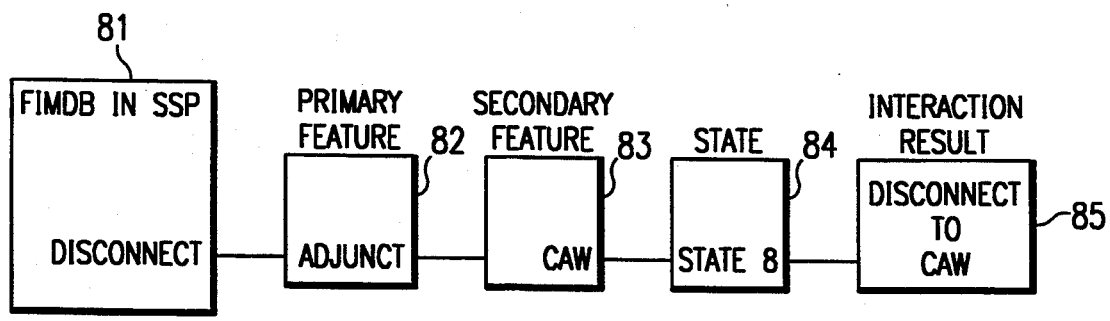

A second case can be illustrated in which a first (FIM1) resides in a service switching platform (SSP) controlling the interactions for the SSP and an SCP. A second FIM (FIM2) resides in an adjunct and controls an adjunct interaction and, in conjunction with the FIM1 in the SSP, network interactions. In this case, there are two FIM databases which require population. In this scenario, the three-way calling (TWC) feature logic resides in the adjunct, but is only identified as an adjunct communication. That is, the global feature identification number is not known to the SSP or the SCP and the feature is only identified as an address in the adjunct. The call waiting feature (CAW) resides in an SSP where the interactions are controlled by the first FIM (FIM1) in the SSP. That is, the global feature identification number is known to the SSP for this particular feature. In this case, the FIM database in the SSP may be populated by the administration issuing a command as set forth below:

COMMAND: SNB=snb; AFL=CAW & ADJUNCT; EVENT=DISCONNECT; STATE=STATE8; RESULT=DISCONNECT-CAW;

As indicated in FIG. 6E, the FIM database 81 in the SSP is populated with the primary feature 82 being shown as the ADJUNCT and the secondary feature 83 being shown as call waiting (CAW). Additionally, the STATE category is shown to be STATE8 while the interaction cell result 85 is that of sending a DISCONNECT message to the call waiting logic.

The population of the FIM1, located in the SSP, is further effected by the following commands from the administration:

COMMAND: SNB=snb; AFL=CAW & ADJUNCT; EVENT=CONTINUE; STATE=STATE9; RESULT=DISCONNECT-ADJUNCT;

COMMAND: SNB=snb; AFL=CAW & ADJUNCT; EVENT=CONTINUE; STATE=STATE2; RESULT=CONTINUE;

In addition, the FIM2, located in the adjunct, is populated with the following command by the administration:

COMMAND: SNB=snb; AFL=CAW & TWC; EVENT=CONTINUE; STATE=STATE9; RESULT=DISCONNECT-TWC;

Each time the SSP communicates with the adjunct it is necessary to include each of the following items of information in the message accompanying that communication so that the FIM in the adjunct will receive all the necessary information to make the appropriate decisions. This information includes the following:
(a) connection view state;
(b) active feature list;
(c) pending feature list;
(d) possible inhibit list; and
(e) controlling leg state.

CASE 3

A third case may be illustrated in which a FIM resides on all platforms, that is, the SSP, the adjunct and the SCP. Each platform is responsible for controlling its own interactions and for network interactions. This is a similar scenario to that shown in FIG. 1 hereof which indicates that there are three FIM databases to populate.

In this scenario, the three-way calling FIM logic resides in the adjunct and the call waiting FIM logic resides in the SCP. Both features are not known to the SSP, i.e., there is no global feature identification and they exist only as addresses in their respective platforms. In these situations, the three FIM databases may be populated as follows by actions taken by the administration.

First, with respect to the SSP FIM, the following commands may be used:

COMMAND: SNB=snb; AFL=ADJUNCT & SCP; EVENT=DISCONNECT; STATE=STATE8; RESULT=DISCONNECT-SCP;

COMMAND: SNB=snb; AFL=ADJUNCT & SCP; EVENT=CONTINUE; STATE=STATE9; RESULT=DISCONNECT-ADJUNCT;

COMMAND: SNB=snb; AFL=ADJUNCT & SCP; EVENT=CONTINUE; STATE=STATE2; RESULT=CONTINUE;

With respect to the SCP FIM, the following commands may be used:

COMMAND: SNB=snb; AFL=ADJUNCT & CAW; EVENT=DISCONNECT; STATE=STATE8; RESULT=DISCONNECT-CAW;

COMMAND: SNB=snb; AFL=ADJUNCT & CAW; EVENT=CONTINUE; STATE=STATE9; RESULT=CONTINUE;

With respect to the ADJUNCT FIM, the following commands may be used:

COMMAND: SNB=snb; AFL=TWC & SCP; EVENT=DISCONNECT; STATE=STATE9; RESULT=DISCONNECT-TWC;

COMMAND: SNB=snb; AFL=TWC & SCP; EVENT=CONTINUE; STATE=STATE2; RESULT=CONTINUE;

All necessary data must be included in all communications to all platforms because there is no global feature identification as to any of these features on their respective platforms. Therefore, each communication within the network as to each of the platforms must include the following features:
(a) connection view state;
(b) controlling leg state;
(c) active feature list/active platform (e.g., SCP/ADJUNCT);
(d) pending feature list/pending platform (e.g., SCP/ADJUNCT); and
(e) possible inhibit list.

As can be seen from each of the above examples of database population indicated in FIGS. 6B–6E, FIM databases are populated by the system administration in accordance with the desired interaction results to be achieved under given events which may occur within the network. Each of these events should precipitate a particular interaction result depending upon other parameters which exist. Messages are sent by the FIMs to the appropriate feature managers to effect the proper disposition of those interactions. The examples in the flow charts set forth below are further illustrative of the manner in which feature interaction decisions are made depending upon which events occur and in accordance with the administration populated FIM databases.

Set forth below in conjunction with the flow charts of FIGS. 7A–7H, 8A–8D, 9A and 9B, as well as the diagrams of FIGS. 10A–10C, is an example of the way in which a feature interaction manager constructed in accordance with the present invention resolves feature interactions occurring between two call features. The features used in the example described below may reside on different platforms, e.g., the service switching platform (SSP), i.e., the telecommunication switch, an adjunct or a service control point (SCP). Each feature is considered to be mutually exclusive; that is, each feature acts independently of the other and is not aware of the existence of the other. In the example described below, the feature interaction manager (FIM) resides in the SSP; however, it is irrelevant where the feature service logic resides within the network as long as each feature is identified by a unique global identification designation. It should also be noted in the example set forth below from the description of the behavior of the features and the communication between the various components, there has been no effort made to optimize the number of transactions between the SSP and the feature service logic, but rather, to explain in more detail, by way of example, the basic concepts involved in the FIM functionality.

The first feature employed in the example set forth below, call waiting (CAW), is active on the controlling subscriber, i.e., the subscriber who has been provided with the CAW feature and which is actively engaged with another call. That is, the controlling subscriber is in a speech condition with another call and hears a call waiting tone in the instrument he is using for access. The call waiting subscriber, who is calling the controlling subscriber, hears a ringing tone in his telephone instrument. In the example set forth below, if the controlling subscriber goes on-hook with his telephone instrument, the result is a reconnection to the call waiting subscriber, i.e., the subscriber who is calling the controlling subscriber and who was previously hearing a ringing tone in his telephone instrument.

The other feature involved in the example set forth below is three-way call conference (TWC) which is active on the controlling subscriber, i.e., the controlling subscriber who has been provisioned with the TWC feature, and the controlling subscriber is in a conference configuration with two other calls. In the present example, if the controlling subscriber goes on-hook, the result is a disconnection of the two remaining calls.

In the feature interaction scenario set forth in the following example, the controlling subscriber is provisioned with both CAW and TWC. The controlling subscriber is actively involved in a TWC conference call with two other calls and is actively involved in a CAW call as a result of having been called by an outside third party. That is, the controlling subscriber involved in the conference call hears a call waiting tone in the telephone instrument. If the controlling subscriber were to have gone on-hook with the telephone instrument, as described above, both the TWC and CAW features would, under normal conditions, expect to receive a disconnect EVENT from the service switching platform (SSP) of the switch. This exemplary scenario represents a typical real time feature interaction issue. In the example set forth below, the controlling subscriber has customized the behavior of this particular feature interaction to result in:

(a) complete disconnection of the remaining legs of the call (each leg represents each call the controlling subscriber was in conference with); and (b) reconnection of the controlling subscriber to the call waiting subscriber.

In order for the feature interaction manager employed in the example set forth below to function correctly, it includes certain feature design prerequisites as follows:

(a) all features which expect to have their interactions resolved by the feature interaction manager (FIM) must be visible and conform to the basic half call model as specified by C.C.I.T.T. or other appropriate standards setting bodies;

(b) all features must be assigned a unique global identification designation irrespective of their location or the platform upon which they are implemented;

(c) all features must expect to receive connection views which, under normal circumstances, they would not expect to receive. In such cases the feature logic would only manipulate call legs that they would manipulate under normal operating conditions;

(d) all features must be designed exclusively from one another and must be behaved in an autonomous fashion;

(e) all features must be a stable condition before sending a CONTINUE message or its equivalent response. This requires that all records such as AMA (billing), STATISTICS, and NEXT EVENT LIST (NEL) are updated prior to the feature sending a continue or equivalent response;

(f) features may only leave the call by specifying a NEXT EVENT LIST (NEL) of null followed by a CONTINUE message, such message containing no call related data;

(g) features must expect to be preempted by the feature interaction manager (FIM); however, the features may update any necessary records; and (h) features must expect that the BCM state may be other than what is normally expected on receipt of a given event.

The processes illustrated in the flow charts of FIGS. 7A-7H, represent processes which occur in the feature manager (FM) as part of the call completion logic of the service switching platform (SSP). These procedures relate to the example of FIM data base population given above in connection with Case 1. The processes illustrated in connection with FIGS. 8A-8D represent functionality implemented within the feature interaction manager (FIM) which, as stated above, may be located in any platform in the network, but in the present example has been chosen to reside in the call completion logic of the service switching platform (SSP). The processes illustrated in the flow charts of FIGS. 9A and 9B illustrate functionality of the feature logic implemented as part of the call completion logic within the service switching platform in the present example although, as mentioned above, could reside in any of the elements within the network.

Referring first to FIG. 7A, the processing begins with the receipt of a disconnect message received from the SSP in response to the controlling subscriber going on-hook with the telephone instrument. At 101, the feature manager (FM) receives a message indicative of the event which occurred, in this case a disconnect event, from the call processing logic of the service switching platform. Next, at 102, the system loads the connection view state identity into the feature manager.

Referring briefly to FIG. 10A, the connection view at this point in the processing is shown (representing state 8 as used in the example above in association with the exemplary FIM data base population of Case 1), indicating in the upper diagram that the controlling subscriber is in a three-way conference call with two parties and, as indicated in the lower diagram, receives a call from another party at the same time. Each connection view state which may occur in the switch is assigned an identity number, as illustratively represented in the multiple diagrams of FIGS. 2A-2K, to simplify message exchange during processing.

Referring again to FIG. 7A, at 103, the system loads the active features of the controlling subscriber, in this case CAW and TWC, into the feature manager. Next, at 104, the system loads into the feature manager an identification of all possible pending features for the particular event received, i.e., a disconnect event. In this particular example, no such possible pending features are present. At 105, the system loads the status indication for the controlling call leg, e.g., whether it is split, joined, pending, surrogate, shared, etc. In this particular example, such load status is not used. Finally, at 106, the feature manager sends a message to the feature interaction manager (FIM) identifying which particular event has occurred and asks the feature manager how to proceed further in the processing. This message leads to the flow chart of FIG. 8A which sets forth the processing procedures incorporated into the feature interaction manager and illustrates the branching parameters with which it performs its functions. The administration has previously populated the FIM data base as illustrated in FIG. 6B and described above in connection with Case 1.

Figure 7G:
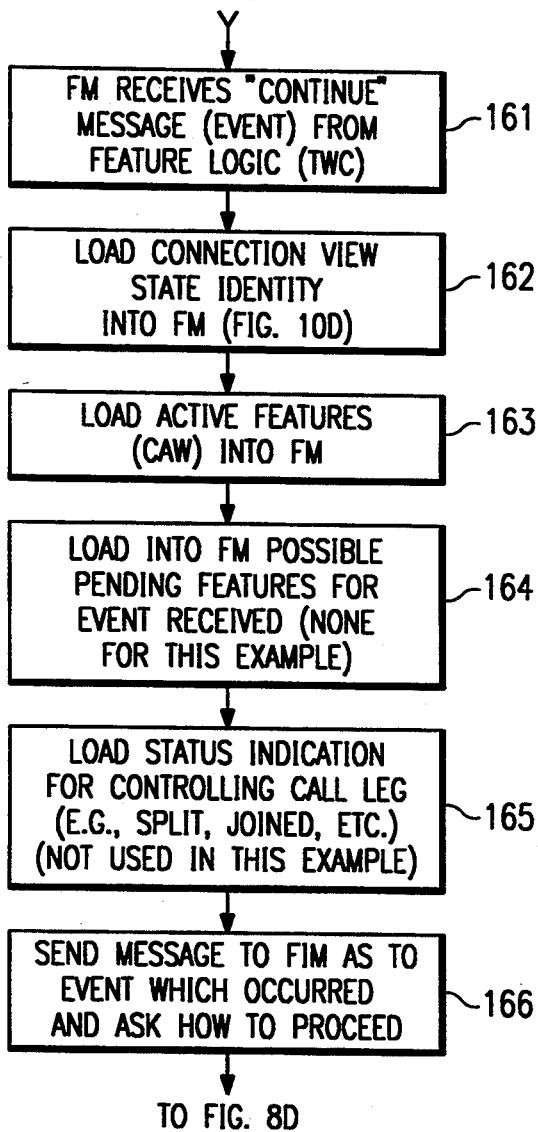
Figure 8A:
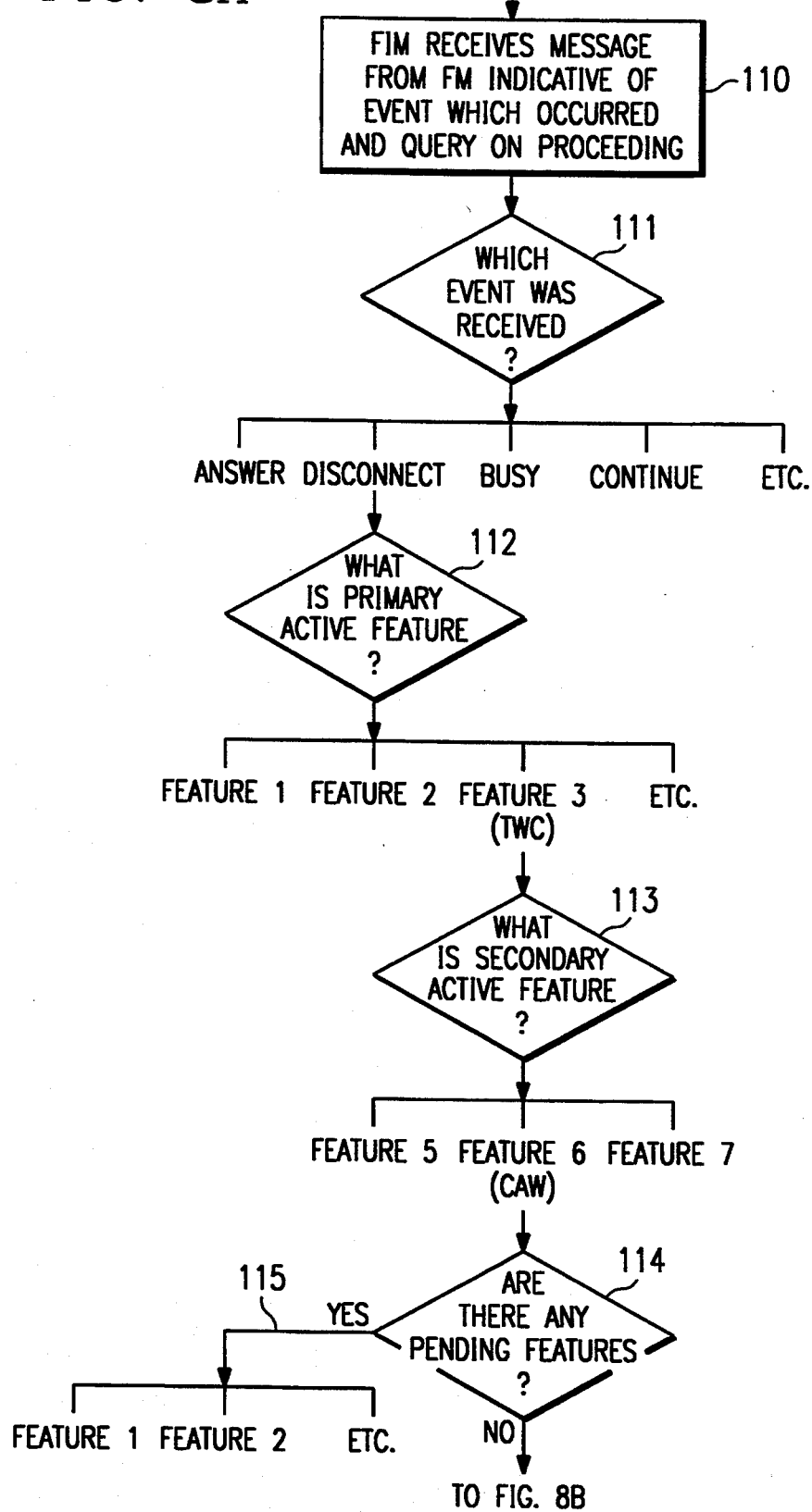

Referring to FIG. 8A, the feature interaction manager (FIM) receives a disconnect and query message from the FM asking how to proceed with respect to the processing of the message it received from the SSP. At 110, the FIM receives the message from the FM indicative of the event which occurred as well as a query on additional proceeding. At 111, the system asks which event was received by the FM and by examination of the message received, determines from the number of possible events, including ANSWER, BUSY, CONTINUE, etc., that it was an DISCONNECT message. At 112, the system asks what is the primary active feature from among those features currently active with respect to the controlling subscriber. Each possible feature is given a global numerical value. The primary active feature is the feature with the lowest numerical value and does not concern itself with priority of features over one another at this point. Assuming that threeway calling (TWC) is feature number 3 (illustratively indicated above as feature number 15 in connection with the example of Case 1) and call waiting (CAW) is feature number 6 (illustratively indicated above as feature number 18 in connection with the example of Case 1), the system first moves through the branch of TWC to 113 where it inquires as to what is the secondary active feature. Moving through the CAW branch to 114, the system inquires whether or not there are any pending features. If so, the system would move along branch 115 to determine what features were pending. If pending features can be invoked by this event which has been received, then the pending features are processed in the same way as active features. If no active features were involved, then the FIM uses the same mechanism for prioritization of the pending features. In the present example there were no pending features. Thus, due to a negative response at 114, the processing of the FIM moves to FIG. 8B and inquires at 116 as to what is the connection view state. As pointed out above, each connection view state is assigned a specific designation to assist in communication within the system. Assuming the connection view state, illustrated in FIG. 10A, is state number 1 (illustratively identified in FIG. 10A as state 8 per the example of FIG. 2H), the system moves to 117 and inquires whether or not the leg status is required. If so, the system moves to branching parameters at 118 to extract the information with regard to leg status from the feature manager, i.e., whether the leg is pending, split, etc. Since leg status is not required in the present example, the system moves to 119 at which it reaches a "result cell". After the FIM has processed all branching parameters within its realtime database, the result cell contains the result of the particular feature interaction which has been previously defined through administrative action by the operator of the system, as illustrated in FIG. 6B and discussed above with respect to Case 1. The system moves to 120 at which it sends a feature interaction result message obtained from the result cell, i.e., "send the event to the feature logic for the call waiting feature (CAW)", to the feature manager. The processing sequence then moves to FIG. 7B and at 121 the FM receives the feature interaction result message from the FIM (that is, to send the disconnect event to the first feature logic). At 122, the system sends the message identifying the particular event received to the relevant feature logic (CAW) indicative of the event which has occurred. At 123, the DISCONNECT event message is sent to the CAW logic after which the system moves to the processing sequence of FIG. 9A. Upon receipt of the message, the feature logic and the SSP receives the event message at 125, i.e., the CAW logic receives the DISCONNECT message, and moves to 126 at which the feature logic responds to the event by sending an appropriate instruction for action to be taken by the call completion logic of the SSP to the feature manager. In this particular case, the instruction is a move leg message. Next, at 127, the FM forwards instructions on to the SSP for processing of the appropriate action and the call completion logic moves the leg as instructed. At 128, following a successful completion of the action required of the SSP, the FM sends a completion acknowledgement message to the feature logic for the CAW feature being processed. Next, at 129, the feature logic for the CAW feature instructs the SSP to update the necessary data within the system, e.g., the automatic message accounting (AMA) data, the next event list (NEL), or other necessary data. Thereafter, processing turns to FIG. 7C and the FM receives at 131 a message from the feature logic telling it to instruct the SSP to update all necessary data. At 132, the FM forwards such instructions on to the SSP for processing by updating all the necessary data. At 133, upon successful completion of the updating action by the SSP, the FM sends an update successful message to the feature logic for the CAW feature which, thereafter, responds by sending a "continue" message to the FM. The logic flow of processing then moves to FIG. 7D and the "continue" message is processed as illustrated in FIG. 6C and discussed above with reference to Case 1.

Referring to FIG. 7D, at 135, the FM receives the "continue" message (event) from the feature logic for the CAW feature and, at 136, the connection view state identity is loaded into the FM. At this point, the connection view is represented by the diagram of FIG. 10B (this state was illustratively referred to above as state 9 as exemplified in FIG. 2J). Next, at 137, the active features, CAW and TWC, are loaded into the FM and, at 138, there is loaded into the FM all possible pending features for the event received. In the particular example there are none and the system moves to 139 at which the status indication for the controlling call leg is loaded into the feature manager, if such is used for the particular feature and event. However, in the present example, the controlling call leg status is not used. At 141, the FM sends a message to the FIM as to the event which occurred and asks how to proceed further.

Referring next to FIG. 8C, at 142, the FIM receives a message from the FM indicative of the continue event which has occurred as well as its query on further proceedings. At 143, the FIM processes the event, in accordance with the branching parameters illustrated in FIGS. 8A and 8B, and in response to such processing informs the FM of the result based upon the result cell which was reached, similar to that procedure illustrated in FIG. 7B. Next, at 144, the FIM sends a disconnect event message to the feature logic for the next feature, i.e., the TWC feature, and moves to FIG. 7E for continuance of processing. At 145, the FM receives the feature interaction result message from the FIM, i.e., the instruction to send a disconnect event to the second feature, and upon moving to 146, sends a message to the relevant feature logic (the TWC feature logic) indicative of the event which occurred. At 147, the disconnect event message is sent to the TWC logic after which the system moves to FIG. 9B where, at 151, the feature logic within the call completion logic of the service switching platform (SSP) receives the event message, i.e., the TWC feature logic receives a disconnect message, and upon movement to 152, the feature logic responds to the event by sending instructions for SSP action to the FM. This consists of a clear remaining call leg message. At 153, the FM forwards the instructions on to the SSP for processing of appropriate action by the clearance of all remaining legs of the call. At 155, upon successful completion of the action by the SSP, the FM sends a completion acknowledgement message to the feature logic for the TWC feature. At 151, the feature logic for the TWC feature instructs the SSP to update all necessary data, including AMA, NEL, etc., and moves to FIG. 7F for further processing.

Referring to FIG. 7F, at 156, the FM receives a message from the feature logic to instruct the SSP to update the data and, at 157, the FM forwards those instructions on to the SSP for processing by updating the necessary data. Upon completion of the updating action by the SSP at 158, the FM sends an update successful message to the feature logic for the TWC feature which, thereafter, responds by sending a "continue" message to the FM. The system then moves to FIG. 7G. Upon receipt at 161 by the FM of a "continue" message (i.e., the event) from the feature logic for the TWC feature, the system moves to 162 at which the connection view state identity is loaded into the FM. At this point in the process, the connection view is that illustrated in the diagram of FIG. 10C (this state was illustratively referred to above as state 2 as exemplified in FIG. 2B). At 163, the system loads the active features for the CAW feature into the FM and moves to 164 at which there is loaded into the FM all possible pending features for the event received. In the particular example there are none. At 165, the system loads a status indication for the controlling call leg; however, in this particular example, such an indication is not used. At 166, a message is sent from the FM to the FIM as to the event which occurred along with a query as to how to proceed next in processing. The administration has previously populated the FIM data base as illustrated in FIG. 6D and described above in connection with Case 1. The system then moves to FIG. 8D where, at 167, the FIM receives a message from the FM indicative of the event, i.e., the continue event, which occurred along with the query on further processing. At 168, the FIM processes the event, in a fashion similar to that illustrated in connection with FIGS. 8A and 8B discussed above, and thereafter informs the FM of the result obtained from the result cell, similar to that illustrated in connection with FIG. 7B above. At 169, if no additional feature interactions are present as in the current example, the system sends a "continue" message to the FM and moves to FIG. 7H.

Figure 7H:
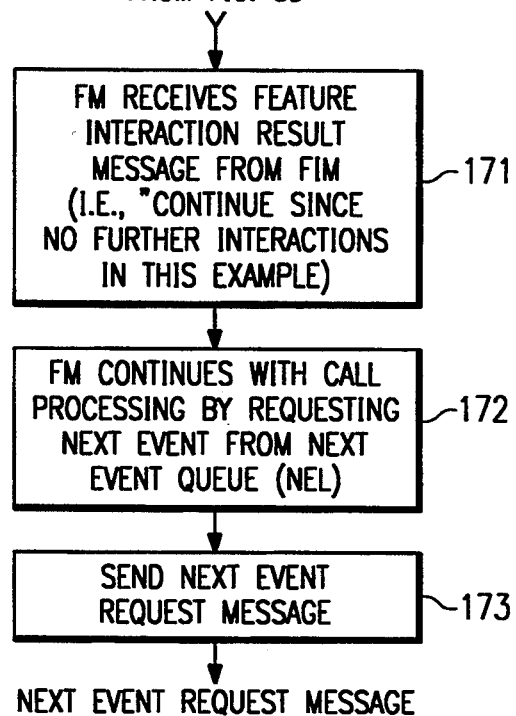

Referring now to FIG. 7H, at 171, the FM receives a feature interaction result message from the FIM, i.e., a "continue" message, since no further interactions are necessary in the present example. At 172, the FM continues with call processing by requesting the next event from the next event queue (NEL) and moves to 173 at which the system sends a next event request message in order to obtain the next event from the queue and continue processing as set forth above.

As can be seen from the above description, the feature interaction manager of the present invention enables multiple features implemented within a telecommunication switching network to be controlled in a logical manner eliminating inappropriate or detrimental interactions among those features in response to events which produce undesired actions within the switch due to interactions between features.

It is believed that the operation and construction of the present invention will be apparent from the foregoing description and, while the method and apparatus shown and described has been characterized as being preferred, obvious changes and modifications may be made therein without departing from the spirit and scope of the invention as defined in the following claims.

What is claimed is:

1. A method for controlling the interaction of features within a telecommunication switching network which includes a service switching platform having call completion logic and software logic blocks for the implementation of particular call features, and feature managers for providing control signals to the service switching platform for invoking and implementing a feature in response to subscriber produced events within the network, the method comprising:
   providing a feature interaction manager connected to each feature manager for controlling the exchange of information between the service switching platform and each feature manager, said information indicating the events occurring within the service switching platform and enabling the smooth interaction of a plurality of features invoked by a single subscriber during a call within the service switching platform.

2. A method for controlling the interaction of features within a telecommunication switching network as set forth in claim 1 which also includes:
   storing within a data base to which said feature interaction manager has access, information associated with each subscriber which can invoke said features and is indicative of parameters related to the invocation and use of said features by said subscriber.

3. In a telecommunications network serving a plurality of subscribers,
   a service switching platform including logic for the completion of calls between said subscribers;
   software blocks for providing feature logic for the implementation of a plurality of call features in response to network events produced by actions taken by said subscribers;
   a feature manager associated with said call features for receiving signals from the network indicative of events produced by actions by said subscribers and for providing control signals to said call feature logic;
   a data base for storing information related to each subscriber within the network having the capability of invoking and controlling said call features, said information comprising:
   a next event list containing all events to which said feature logic is responsive;
   a connection view indicative of the current connection state of said subscriber;
   a list of all call features which can be invoked by said subscriber; and
   a list of all call features currently active for said subscriber; and
   a feature interaction manager connected between said feature manager and said data base for receiving signals from said feature manager indicative of events received by said manager and including means responsive to said received events and said information stored within said data base related to the subscriber which caused said events for instructing said manager on what signals to send to said feature logic in order to interactively implement the features invoked by the events produced by the actions of said subscriber.

4. In a telecommunications network the combination set forth in claim 3, wherein:
said event responsive means within said feature interaction manager includes decision tree logic means programmable by the operator of said network.

5. In a telecommunications network the combination set forth in claim 3, wherein said feature manager includes:
means for storing each of said event indicative signals received from the network in a buffer memory; and
means for forwarding each stored successive event indicative signal to said feature interaction manager in response to the receipt of a continue signal from said feature interaction manager.

6. In a telecommunications network the combination set forth in claim 3, wherein said network includes an adjunct and said feature interaction manager is located within said adjunct.

7. A method for managing the interaction of call features within a telecommunications network including a service switching platform having logic for implementing at least two call features in response to network events associated with subscriber actions, a feature manager associated with said features, a feature interaction manager associated with said feature manager and a data base, said method comprising:
storing in the data base a set of information associated with at least one subscriber having access to said call features, said information including a next event list containing all the events to which said features are responsive, an indication of the current connection state of said subscriber, a list of all of said features that can be invoked by said subscriber, and a list of said features currently active for said subscriber;
receiving at said feature manager signals from the network indicative of events occurring within said network;
storing said received events in a data buffer within said feature manager;
sequentially comparing within said feature manager each successive event stored in said buffer with information on said next event list stored in the data base and associated with said subscriber;
transferring an indication of the occurrence of each said stored event to said feature interaction manager in response to a correspondence between each said stored event and information on said next event list;
determining in accordance with an algorithm the information to be transferred to said feature logic by said feature manager in order to implement said features for said subscriber;
updating said next event list in said data base in accordance with said information to be transferred to said feature manager; and
transferring said information to said feature manager.

8. A method for managing the interaction of call features within a telecommunications network as set forth in claim 7 wherein said algorithm is configurable by the operator of the service switching platform.

9. A method for managing the interaction of call features within a telecommunications network as set forth in claim 7 in which said algorithm includes as a decision parameter one or more items of said set of information stored in said data base.

10. A method for managing the interaction of call features within a telecommunications network as set forth in claim 7 which includes the additional step of:
inhibiting the comparison of each successive event stored in said buffer with events on said next event list until said feature logic has processed the information received in response to the previous comparison.

11. A method for managing the interaction of call features within a telecommunications network as set forth in claim 10 wherein said feature logic produces an acknowledge signal indicative of having completed processing of each instruction.

12. A method for managing the interaction of call features within a telecommunications network as set forth in claim 7 in which said determining step includes:
producing a result from a decision logic tree;
furnishing said result to the feature interaction manager; and
sending control instructions from the feature interaction manager to the feature manager.

13. A system for managing the interaction of call features within a telecommunications network including a service switching platform having logic for implementing at least two call features in response to network events associated with subscriber actions, a feature manager associated with each feature, a feature interaction manager associated with said feature manager and a data base, said system comprising:
means for storing in the data base a set of information associated with at least one subscriber having access to said call features, said information including a next event list containing all the events to which said features are responsive, an indication of the current connection state of said subscriber, a list of all of said features that can be invoked by said subscriber, and a list of said features currently active for said subscriber;
means for receiving at said feature manager signals from the network indicative of events occurring within said network;
means for storing said received events in a data buffer within said feature manager;
means for sequentially comparing within said feature interaction manager each successive event stored in said buffer with information on said next event list stored in the data base and associated with said subscriber;
means for transferring an indication of the occurrence of each said event to the feature interaction manager in response to a correspondence between each said stored event and information on said next event list;
means for determining in accordance with an algorithm the information to be transferred to said feature logic by said feature manager in order to implement said features for said subscriber;
means for updating said next event list in said data base in accordance with said information to be transferred to said feature manager; and
means for transferring to said feature manager said information.

14. A system for managing the interaction of call features within a telecommunications network as set forth in claim 13 wherein said algorithm is configurable by the operator of the service switching platform.

15. A system for managing the interaction of call features within a telecommunications network as set forth in claim 13 in which said algorithm includes as a decision parameter one or more items of said set of information stored in said data base.

16. A system for managing the interaction of call features within a telecommunications network as set forth in claim 13 which also includes:
means for inhibiting the comparison of each successive event stored in said buffer with events on said next event list until said feature logic has processed the information received in response to the previous comparison.

17. A system for managing the interaction of call features within a telecommunications network as set forth in claim 16 wherein said feature logic produces an acknowledge signal indicative of an instruction to continue processing by the service switching platform.

18. A system for managing the interaction of call features within a telecommunications network as set forth in claim 13 which also includes:
means for producing a result from a decision logic tree;
means for furnishing that result to the feature interaction manager; and
means for sending control instructions from the feature interaction manager to the feature manager.

19. A feature interaction manager for a telecommunications network which provides subscribers with call features responsive to subscriber initiated actions, said feature interaction manager comprising:
a central processor software unit;
data files within said software unit for storing the desired results of feature interactions with one another, said results defined by operator commands to provide flexibility in resolving feature interaction conflicts; and
means for periodically providing within said software unit signals representative of the current connection view state of each subscriber having a plurality of active features to supply logic branching parameters within said data files and produce said desired results of interaction between said features.

20. The feature interaction manager of claim 19 wherein said signals representative of said connection views include connection segments and legs representing possible call connection events.

21. A feature interaction manager strategically placed within a telecommunications network to control events generated by said network and administrate features active within subscriber switching platforms, said feature interaction manager comprising:
means for receiving signals communicating call events from said network;
means for invoking features from feature platforms in response to reception of said signals communicating call events;
means for receiving responses from said subscriber switching platforms regarding the status of features; and
means for analyzing said events and said responses from said subscriber switching platforms to resolve feature interaction conflicts.

22. The feature interaction manager of claim 21 wherein said analyzing means includes a central processor software unit, said software unit comprising:
data files for storing the desired results of feature interactions, said results defined by operator commands to provide flexibility in resolving feature interaction conflicts; and
means for providing signals representative of subscriber connection views for use as logic branching parameters within said software unit in reaching said desired results.

23. The feature interaction manager of claim 22 wherein said signals representative of connection views include connection segments and legs representing possible call connection events.

24. A method of controlling events and administrating features within a telecommunications network, said method comprising the steps of:
strategically placing a feature interaction manager in a location within said network to communicate with network switches, adjuncts, and other feature platforms;
receiving signals within said feature interaction manager communicating events from said network;
requesting features from subscriber switching platforms in response to reception of said signals communicating call events;
receiving responses within said feature interaction manager from said feature platforms regarding the status of features; and
analyzing within said feature interaction manager said events and said responses from said subscriber switching platforms to resolve feature interaction conflicts.

25. The method of claim 24 wherein said step of analyzing said events and said responses includes defining the results of feature interaction conflicts through commands to a central processor software unit.

26. The method of claim 25 wherein said step of analyzing said events and said responses includes the steps of:
storing data files containing the desired results of feature interaction conflicts;
storing connection views comprising combinations of possible events;
translating said connection views to logic branching parameters; and
applying said logic branching parameters to said data files to provide flexibility in resolving feature interaction conflicts.

27. The method of claim 26 wherein said step of storing connection views includes storing connection segments and legs representing possible call connection events.

28. The method of claim 24 wherein said other feature platforms include a service control point.

29. A system for controlling events and administrating features within a telecommunications network, said system comprising:
a feature interaction manager strategically placed in a location within said network to communicate with network switches, adjuncts, and other feature platforms;
means for receiving signals within said feature interaction manager communicating events from said network;
means for requesting features from subscriber switching platforms in response to reception of said signals communicating call events;
means for receiving responses within said feature interaction manager from said feature platforms regarding the status of features; and means for analyzing within said feature interaction manager said events and said responses from said subscriber switching platforms to resolve feature interaction conflicts.

30. The system of claim 29 wherein said means for analyzing said events and said responses includes means for defining the results of feature interaction conflicts through commands to a central processor software unit.

31. The method of claim 30 wherein said means for analyzing said events and said responses includes:

means for storing data files containing the desired results of feature interaction conflicts;

means for storing connection views comprising combinations of possible events;

means for translating said connection views to logic branching parameters; and means for applying said logic branching parameters to said data files to provide flexibility in resolving feature interaction conflicts.

32. The method of claim 31 wherein said means for storing connection views includes means for storing connection segments and legs representing possible call connection events.

33. The method of claim 29 wherein said other feature platforms include a service control point.

* * * * *